(12) United States Patent
Hosking et al.

(10) Patent No.: US 10,399,609 B2
(45) Date of Patent: Sep. 3, 2019

(54) MECHANICAL INTERFACE

(71) Applicant: FORD GLOBAL TECHNOLOGIES, LLC, Dearborn, MI (US)

(72) Inventors: Niamh Hosking, Plymouth, MI (US); Kerrie Nikaido Holguin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 15/431,181

(22) Filed: Feb. 13, 2017

(65) Prior Publication Data

US 2018/0229778 A1 Aug. 16, 2018

(51) Int. Cl.
*B62D 27/00* (2006.01)
*B62D 29/00* (2006.01)
*B62D 27/06* (2006.01)
*B62D 33/02* (2006.01)

(52) U.S. Cl.
CPC ........... *B62D 29/005* (2013.01); *B62D 27/00* (2013.01); *B62D 27/065* (2013.01); *B62D 33/02* (2013.01); *B62D 29/00* (2013.01)

(58) Field of Classification Search
CPC .... B62D 29/005; B62D 27/00; B62D 27/065; B62D 33/02

USPC ........................... 296/191, 29, 35.1; 411/546
See application file for complete search history.

(56) References Cited

U.S. PATENT DOCUMENTS

| | | | |
|---|---|---|---|
| 6,394,537 B1 * | 5/2002 | DeRees | B62D 29/048 296/191 |
| 6,485,242 B1 | 11/2002 | Kikawa et al. | |
| 6,659,702 B2 | 12/2003 | Kitayama et al. | |
| 7,048,265 B2 * | 5/2006 | Huprikar | F16F 1/3732 267/141.1 |
| 7,074,348 B2 | 7/2006 | Geer et al. | |
| 8,092,923 B2 | 1/2012 | Thamida | |
| 8,840,350 B2 | 9/2014 | Inaba et al. | |
| 9,266,189 B2 | 2/2016 | Deshpande et al. | |
| 2012/0155988 A1 | 6/2012 | Schumacher et al. | |

* cited by examiner

*Primary Examiner* — Joseph D. Pape
(74) *Attorney, Agent, or Firm* — Vichit Chea; Brooks Kushman P.C.

(57) ABSTRACT

A vehicle includes a first metallic body panel, second metallic body panel, and spacer. The first metallic body panel is secured to the second metallic body panel. The second metallic body panel is comprised of a dissimilar metal relative to the first metallic body panel. The spacer has a concave peripheral surface. The spacer is disposed between and secured to both the first and second metallic body panels such that the concave peripheral surface is exposed via a gap between the first and second metallic body panels.

15 Claims, 3 Drawing Sheets

MECHANICAL INTERFACE

TECHNICAL FIELD

The present disclosure relates to mechanical interfaces between metallic components, such as vehicle body or frame components.

BACKGROUND

Vehicles bodies and frames may comprise several sub-components that are secured to each other through conventional processes.

SUMMARY

A vehicle includes a first body panel, second body panel, and spacer. The first body panel is secured to the second body panel. The second body panel is comprised of a dissimilar material relative to the first body panel. The spacer has a concave peripheral surface. The spacer is disposed between and secured to both the first and second body panels such that the concave peripheral surface is exposed via a gap between the first and second body panels.

A spacer includes first and second opposing external surfaces, a concave peripheral surface, and a hydrophobic coating. The concave peripheral surface forms a closed loop and extends between the first and second opposing surfaces. The hydrophobic coating is deposited on the concave peripheral surface.

A mechanical interface includes a first metallic panel, second metallic panel, and spacer. The first metallic panel is secured to the second metallic panel. The second metallic panel is comprised of a dissimilar metal relative to the first metallic panel. The spacer has a concave peripheral surface. The spacer is disposed between and secured to both the first and second metallic panels such that the concave peripheral surface is exposed via a gap between the first and second metallic panels.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
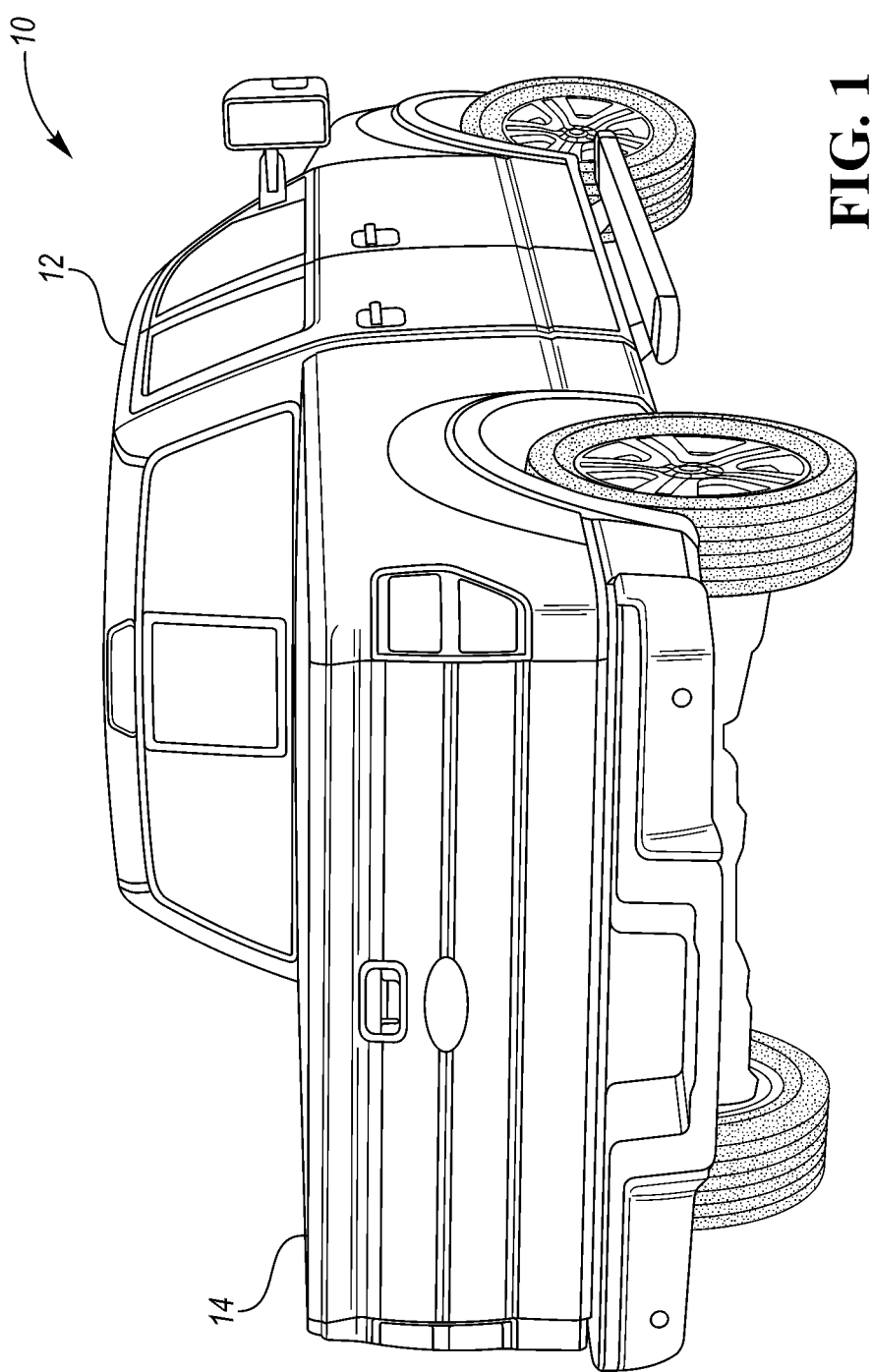
FIG. 1 is a perspective view of a vehicle.

Referring to FIG. 1, a vehicle 10 is illustrated. The illustrated vehicle 10 is shown to be a truck. However, it should be understood that the vehicle 10 may be any other type of vehicle or automobile such as sedan, station wagon, hatchback, bus, etc. The vehicle 10 may include a body 12 (that includes a cabin space) and a cargo bed 14. The body 12 and the cargo bed 14 may each be secured to a frame. Alternatively, the vehicle may have a unibody design that does not include a frame nor a cargo bed, but has a body that includes the cabin space and provides the vehicle's structural support. The body 12 may include various components of the vehicle's body-in-white structure. The body-in-white structure may include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of the vehicle body-in-white structure or the frame known in the art. The body components may be connected to each other by a welding process or by fasteners, such as rivets, screws, bolts, or any other type of faster known to a person of ordinary skill in the art.

Figure 2:
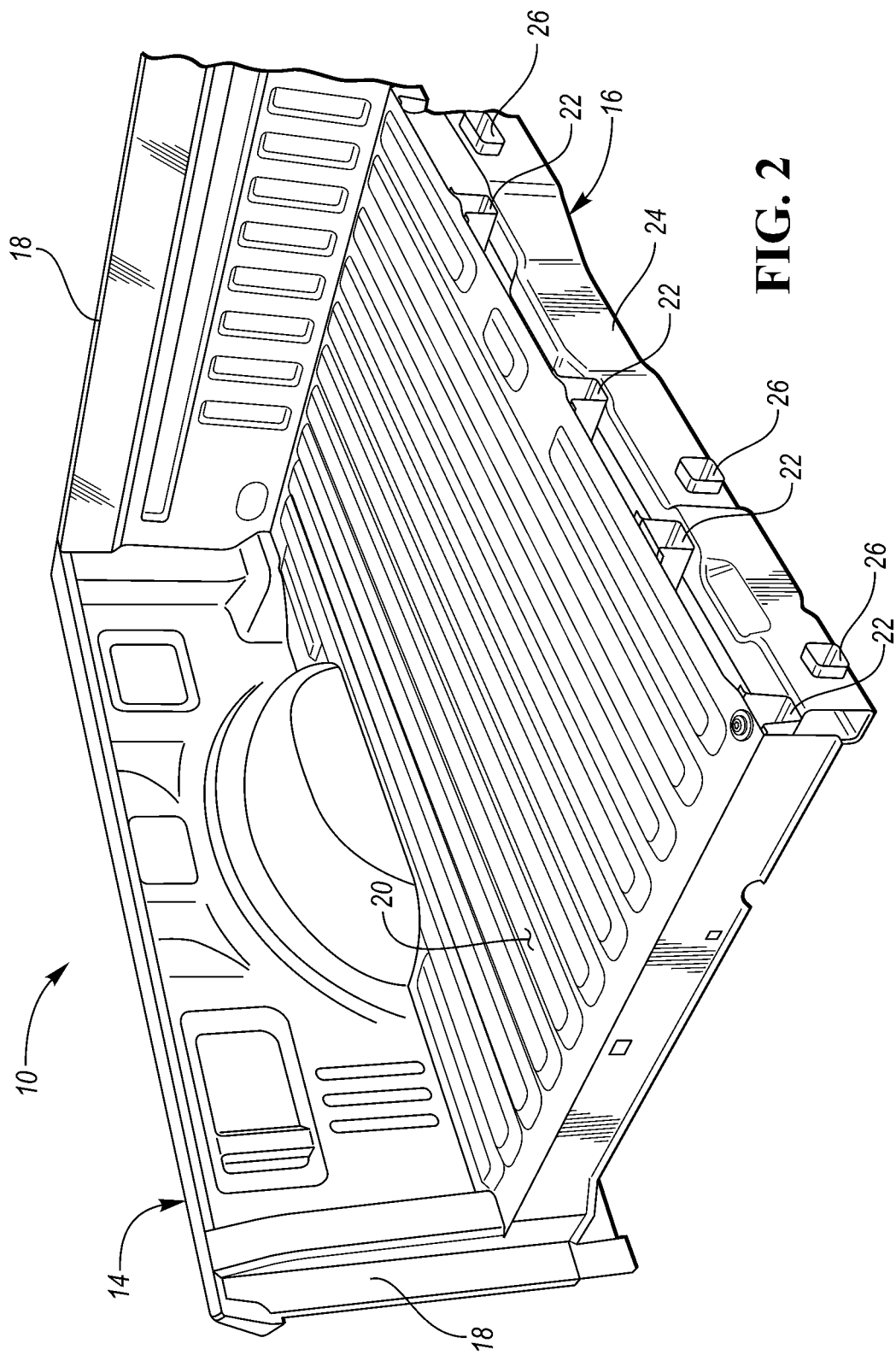
FIG. 2 is a perspective rear view of a portion of the vehicle, including a frame and a cargo bed, is illustrated.

Referring to FIG. 2, a portion of the vehicle 10, including a portion of the frame 16 and the cargo bed (or truck bed) 14, is illustrated. The cargo bed 14 may include a tailgate which has been removed for illustrative purposes in FIG. 2. The cargo bed 14 may include side panels 18, a floor panel 20, and crossbeams 22 secured to and protruding from a bottom surface of the floor panel 20. The crossbeams 22, side panels 18, and floor panel 20 may be connected to each other by a welding process or by fasteners, such as rivets, screws, bolts, or any other type of faster known to a person of ordinary skill in the art. The frame 16 may include rails 24 that extend longitudinally from a rear toward a front of the vehicle 10. A first rail 24 (which is visible along the cutaway portion of FIG. 2) may be substantially parallel with a second rail 24 (which is located below the floor panel 20 and not visible in FIG. 2). The frame 16 may include a plurality of cross-members 26 that extend between each of the rails 24. The cross-members 26 of the frame 16 may be connected to each of the rails 24 in order to secure the rails 24 to each other. The cross-members 26 may be connected to the rails 24 by a welding process or by fasteners, such as rivets, screws, bolts, or any other type of faster known to a person of ordinary skill in the art. The cargo bed 14 may be secured to a top side of the frame 16.

The various components that comprise the body 12, cargo bed 14, and/or frame 16 may be made from dissimilar metals. For example, a first component that is made from steel may be secured to a second component that is made from aluminum, magnesium, titanium, or any alloys thereof. Alternatively, the various components that comprise the body 12, cargo bed 14, and/or frame 16 may be made from dissimilar materials where a first component made from a metallic material (steel, aluminum, magnesium, titanium, or any alloys thereof) is secured to a second component made from a non-metallic material that may cause galvanic corrosion of the first metallic material. For, example, the non-metallic component may be made from composite materials such as fiber-reinforced plastics. Fiber-reinforced plastics (also known as fiber-reinforced polymers) are composite materials made of a polymer matrix reinforced with fibers. The fibers may be glass, carbon, basalt, aramid or other appropriate reinforcing materials. The polymer may be an epoxy, vinylester, polyester thermosetting plastic, phenol formaldehyde resin, or other appropriate polymer or plastic. Fiber-reinforced plastics may also be heat and/or pressure cured.

The first and second components that are both secured to each other and are made from dissimilar materials or dissimilar metals may each be components of the body 12, may each be components of the cargo bed 14, may each be components of the frame 16, may be the interfacing components where the cargo bed 14 is secured to the frame 16, or may be the interfacing components where the body 12 is secured to the frame 16. Alternatively, the first and second components that are both secured to each other and are made from dissimilar materials or dissimilar metals may be a mechanical interface that is not part of a vehicle or a vehicle subsystem. In order to prevent galvanic corrosion between the components that are secured to each other and made from dissimilar materials or dissimilar metals, it may be advantageous to place a spacer between the two components. Galvanic corrosion, however, may still occurs if water droplets bridge the gap between the two components caused by placing the spacer between them. Therefore, it may be advantageous to include a spacer that channels water to a low area and prevents water droplets from bridging the gap between the two components.

Figure 3:
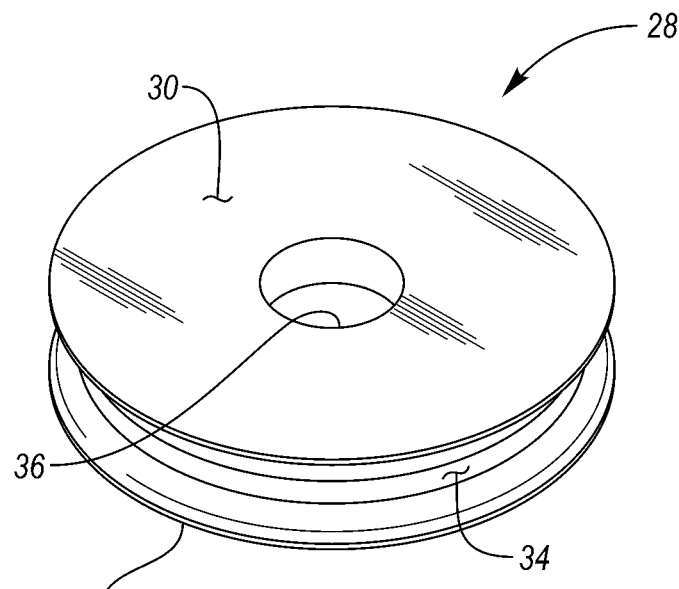
FIG. 3 is a perspective view of a spacer that is utilized in a mechanical interface between a pair of metallic panels.

Referring to FIG. 3, a perspective view of a spacer 28 that is utilized in a mechanical interface between a pair of panels is illustrated. The spacer 28 includes a first external surface 30 that is located on an opposing side of the spacer 28 relative to a second external surface 32. A concave peripheral surface 34 extends between the first external surface 30 and the second external surface 32. The concave peripheral surface 34 may form a closed loop that extends around the entire periphery (i.e., the entire circumference) of the spacer 28. The spacer may define a first orifice 36 that is configured to receive a fastener. The spacer 28 is shown as cylindrical in shape with a circular cross-sectional area. This disclosure, however, should not be interpreted as limited to spacers having a particular shape or cross-sectional area, but should include spacers having different shapes or forms. For example, the spacer may have a cross-sectional area that is oval shaped, rectangular shaped, triangular shaped, etc.

Figure 4:
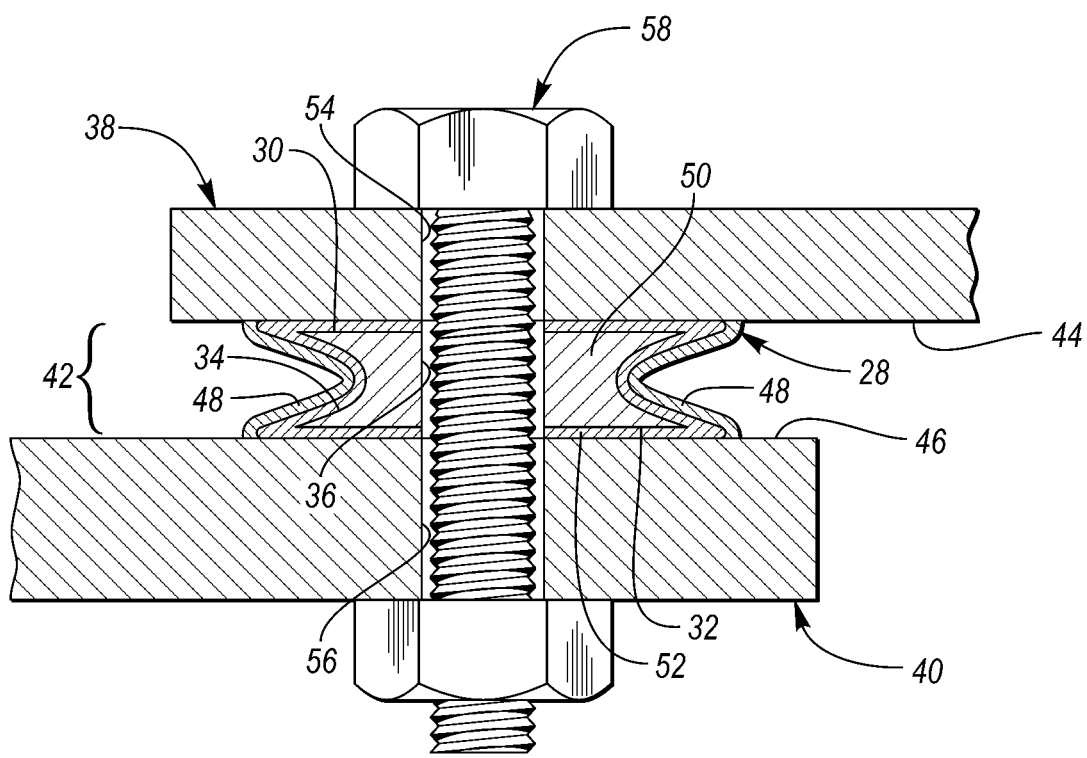
FIG. 4 is a cross-sectional view of a mechanical interface between a pair of metallic panels.

Referring to FIG. 4, a cross-sectional view of a mechanical interface between a first panel 38 and a second panel 40. The first panel 38 and second panel 40 are made from dissimilar materials or dissimilar metals, as described above. The first panel 38 and second panel 40 may be any of the components that comprise the body 12, cargo bed 14, or frame 16, described above. The first panel 38 and second panel 40 may be may be referred to as body panels regardless if they are components or sub-components of the body 12, cargo bed 14, or frame 16. The first panel 38 and second panel 40 may refer to portions of a components. For example, the first panel 38 may a first leg of an L-shaped bracket while the second panel 40 is a sidewall of a tube having rectangular-shaped cross-sectional area. The spacer 28 may be secured to both the first panel 38 and second panel 40 such that the concave peripheral surface 34 is exposed via a gap 42 between first panel 38 and second panel 40, the gap 42 being caused by the placement of the spacer 28 between the first panel 38 and second panel 40. Furthermore, the first external surface 30 of the spacer 28 may contact an internal surface 44 of the first panel 38 while the second external surface 32 of the spacer 28 contacts an internal surface 46 of the second panel 40.

A first external coating 48 may be deposited on the concave peripheral surface 34. The external coating may comprise either a hydrophobic material or a hydrophilic material. Common hydrophobic materials include fluoropolymers, and organosilanes (functional silica). Hydrophobic materials may also include omniphobic materials that are resistant to adhesion with both water and oil. Common hydrophilic materials include titanium dioxide-based coatings. The hydrophobic or hydrophilic coating may be configured to channel water to a low area and prevent water droplets from bridging the gap 42 between first panel 38 and second panel 40. The spacer may be made from materials such as metals (e.g., steel, aluminum, magnesium, titanium, or any alloy thereof), fiber reinforced plastics, or hard silicones. In the event that the spacer is covered with an external coating, the material that the spacer is made from may be referred to as the base material 50. In the event that the base material 50 is comprised of a metallic or non-metallic material that is a dissimilar material or dissimilar metal relative to either the first panel 38 or the second panel 40, it may be advantageous to provide a second external coating 52 over the first external surface 30 and/or the second external surface 32 of the spacer 28 in order to prevent or reduce galvanic corrosion. The second external coating 52 may be either a zinc-plating layer and/or an e-coating layer. There may also be a pretreatment layer between a zinc-plating layer and an e-coating layer, in instances where both are used. Common pretreatment materials include Zinc phosphate and zirconium titanium. The second external coating 52 may also be deposited on the concave peripheral surface 34 between the base material 50 and the first external coating 48.

E-coating may refer to electrophoretic deposition (EPD), which is a term that includes a broad range of industrial processes which includes electrocoating, cathodic electrodeposition, anodic electrodeposition, and electrophoretic coating, or electrophoretic painting. The process includes depositing materials (i.e., the e-coating layer) onto a surface that is functioning as an electrode. The materials that may be deposited onto a surface during an e-coating process to form the e-coat may be polymers, pigments, dyes, ceramics, metals, or any combination thereof.

The first panel 38 may define a second orifice 54 and the second panel 40 may define a third orifice 56. The first orifice 36 of the spacer 28, second orifice 54 of the first panel 38, and third orifice 56 of the second panel 40 may be brought into alignment or registration with respect to each other. A fastener 58 may be disposed within the first orifice 36, second orifice 54, and third orifice 56 when aligned in order to secure the first panel 38, second panel 40, and spacer 28 to each other. The fastener may be a rivet, screw, bolt, or any other type of faster known to a person of ordinary skill in the art. More specifically, the fastener may be a bolt that engages a nut or tapped hole.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a first body panel secured to a second body panel comprised of a dissimilar material relative to the first body panel; and
   a spacer having a concave peripheral surface, disposed between and secured to both the first and second body panels such that the concave peripheral surface is exposed via a gap between the first and second body panels.

2. The vehicle of claim 1, wherein a hydrophobic coating is deposited on the concave peripheral surface.

3. The vehicle of claim 1, wherein a hydrophilic coating is deposited on the concave peripheral surface.

4. The vehicle of claim 1, wherein the spacer has first and second opposing surfaces, the concave peripheral surface extends between the first and second opposing surfaces, the first opposing surface contacts an internal surface of the first body panel, and the second opposing surface contacts an internal surface of the second body panel.

5. The vehicle of claim 4, wherein the spacer is comprised of a metallic base material and a zinc-plating is deposited on the first and second opposing surfaces over the metallic base material.

6. The vehicle of claim 4, wherein the spacer is comprised of a metallic base material and an e-coating layer is deposited on the first and second opposing surfaces over the metallic base material.

7. The vehicle of claim 1, wherein the first body panel, second body panel, and spacer define aligned orifices, and a fastener is disposed within the aligned orifices to secure the first body panel, second body panel, and spacer to each other.

8. The vehicle of claim 1, wherein the first body panel is comprised of aluminum and the second body panel is comprised of steel.

9. The vehicle of claim 1, wherein the first body panel is comprised of fiber-reinforced plastic and the second body panel is comprised of steel.

10. A mechanical interface comprising:
    a first metallic panel secured to a second metallic panel comprised of a dissimilar metal relative to the first metallic panel; and
    a spacer having a concave peripheral surface, disposed between and secured to both the first and second metallic panels such that the concave peripheral surface is exposed via a gap between the first and second metallic panels.

11. The mechanical interface of claim 10, wherein a hydrophobic coating is deposited on the concave peripheral surface.

12. The mechanical interface of claim 10, wherein a hydrophilic coating is deposited on the concave peripheral surface.

13. The mechanical interface of claim 10, wherein the spacer has first and second opposing surfaces, the concave peripheral surface extends between the first and second opposing surfaces, the first opposing surface contacts an internal surface of the first metallic panel, and the second opposing surface contacts an internal surface of the second metallic panel.

14. The mechanical interface of claim 13, wherein the spacer is comprised of a metallic base material and a zinc-plating is deposited on the first and second opposing surfaces over the metallic base material.

15. The mechanical interface of claim 14, wherein the spacer is comprised of a metallic base material and an e-coating layer is deposited on the first and second opposing surfaces over the metallic base material.

\* \* \* \* \*